Dec. 12, 1967     J. GREENBERG ET AL     3,357,862
COMBINED ELECTROLYSIS DEVICE AND FUEL CELL
AND METHOD OF OPERATION
Filed Feb. 4, 1964

INVENTORS
JACOB GREENBERG
LAWRENCE H. THALLER

BY

*Norman T. Musial*

ATTORNEYS

United States Patent Office 3,357,862
Patented Dec. 12, 1967

3,357,862
COMBINED ELECTROLYSIS DEVICE AND FUEL CELL AND METHOD OF OPERATION
Jacob Greenberg, Parkview, and Lawrence H. Thaller, Cleveland, Ohio, assignors to the United States of America as represented by the Administrator of the National Aeronautics and Space Administration
Filed Feb. 4, 1964, Ser. No. 342,574
9 Claims. (Cl. 136—86)

The invention described herein may be manufactured and used by or for the Government of the United States of America for Government purposes without the payment of any royalties thereon or therefor.

The present invention relates, generally to fuel cells and, more particularly, to a process and apparatus that utilizes a molten salt to produce useful power by a thermoelectric-regeneration mechanism.

Power-producing electrochemical devices may be divided generally into three broad categories; these are static battery cells, dynamic reserve cells, and fuel cells. However, each of these broad categories suffers from a number of deficiencies. For example, the operating life of a static battery cell or dynamic reserve cell is limited by virtue of the fixed amounts of the active electrode components present in the batteries. Thus, in order to meet large and sustained power demands, batteries of these two types impose large weight penalties on any system in which they are employed. On the other hand, fuel cells which produce electricity directly from the oxidation of fuel are normally provided with fuel from an outside tank or with means for regeneration of the fuel constituents and therefore impose a lesser weight penalty for power generation. Heretofore, however, fuel cells utilizing regeneration have depended on the use of extremely high heat inputs and operating temperatures to physically break down and decompose the cell constituents to thereby provide for continued operation of the fuel cell.

If the regeneration could be accomplished by electrolysis, a much lower heat input would be required than if the compound were decomposed by purely thermal means.

Further, some of the useful power could be obtained from the regeneration cycle by utilizing a portion of the current generated during electrolysis. Molten salts have been discovered to be the best thermoelectric materials for this use because of their relatively good values of figures of merit, their chemical stability, their long liquid range, and the additional fact that they can be designed to operate in conjunction with a nuclear reactor producing heat.

However, when fused salts are utilized as electrolytic conductors for the passage of an electric current, there is a transport of materials and a subsequent decomposition and provision must be made for the removal of these decomposed materials so that they are available for use in the fuel cell section in order for the system to operate effectively.

Accordingly, it is an object of this invention to provide an apparatus combining a thermoelectric regenerator and fuel cell.

It is an additional object of the invention to provide a method for producing power by a thermoelectric-regeneration mechanism.

It is still another object of the invention to provide a fuel cell utilizing the decomposition products of a molten salt as the reactants.

It is yet another object of the invention to provide a fuel cell and regeneration system which does not require extremely high thermal energy inputs or operating temperatures to provide for regeneration of the fuel cell reactants.

A more complete appreciation of the invention and many attendant advantages thereof will be readily apparent as the same becomes better understood by reference to the following detailed description when considered in connection with the accompanying drawing wherein.

Figure 1:
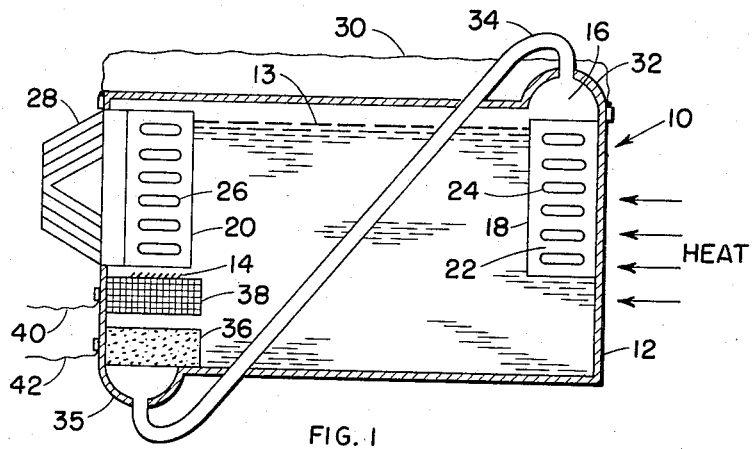
FIG. 1 is a schematic illustration of one form of apparatus utilizing thermoelectric regeneration.

According to the present invention, the foregoing and other objects are obtained by providing a novel method for fuel cell and regenerator operation and apparatus to perform this function. In particular, the invention includes the use of a molten salt capable of an electrolytic conduction, the imposition of a temperature gradient upon the molten fused salt, decomposition of the molten salt into its constituents by electrolysis and the use of these constituents in a fuel cell to produce useful power. Apparatus is provided for performing this method which includes a thermoelectric regenerative section, a fuel cell section, means for supplying the decomposed molten salt constituents to the fuel cell section and means for returning the fused salt to the regenerator section.

From what has been said, it is apparent that practice of the invention involves temperature cycles in which electricity is produced in the fuel cell at a relatively low temperature (sufficient to keep the salt molten) while some useful electricity is produced in the thermoelectric regenerator at a slightly higher average temperature (the average temperature of the regenerator, advantageously, being maintained at between 50° C. and 200° C. above the melting point of the salt). Of course, the actual operating temperatures of the cell and the average operating temperature of the regenerator depend upon the particular molten salt utilized as the electrolyte conductor.

Examination of some salt systems indicates that the polarity of the thermopotential at the hot junction of the regenerator can be either positive or negative with respect to the cooler electrode depending upon the salt used, the gas constituent always being generated at the negative electrode. The polarities of some of the salts found useful in the practice of the instant invention are given in the table below:

| Salt: | Polarity at hot junction |
|---|---|
| $CdBr_2$ | − |
| $CdCl_2$ | − |
| $PbBr_2$ | − |
| $PbCl_2$ | − |
| $ZnBr_2$ | − |
| $ZnCl_2$ | − |
| $AgNO_3$ | − |
| $AgCl$ | − |
| $AgBr$ | + |
| $AgI$ | + |
| $SnCl_2$ | + |

The electrodes utilized for both the regenerator and fuel cell sections must, of course, be inert to permit proper decomposition and recombination. Tungsten and platinum electrodes have been satisfactorily utilized in the practice of this process, both these materials being inert and not reversible in the presence of the aforementioned fused salts. Additionally, the melting point of the metal constituent of the metallic salt must be within the liquidus operating range of molten salt while the boiling point of the metal must be below this range for proper operation to take place. Advantageously, also the metal constituent should be relatively insoluble in the melt to permit proper separation from the thermocell electrode and transport to the fuel cell electrode for electrochemical recombination with the gas constituent. Exemplary of one salt having these requirements is zinc chloride. This salt is especially useful in the practice of the process since zinc is very insoluble in zinc chloride and the precipated metal may then easily be made to react with the released chlorine gas.

Referring now to the drawing wherein like numerals are utilized to indicate like parts throughout the figures, there is shown in FIG. 1 a combined fuel cell and regenerator 10, which comprises a container 12 that completely surrounds and encloses the molten salt 13, for example, zinc chloride and its disassociated metal and gaseous constituents 14 and 16, respectively. Mounted within the container are a pair of upper electrodes 18 and 20 that are immersed therein and insulated from the container 12. Heat is applied to the fuel cell and regenerator 10 contiguous to the electrode 18 so that it is maintained at a higher temperature than the electrode 20, the electrode 18 forming, in the case of zinc chloride, the cathode and the electrode 20 forming the anode.

Advantageously, the electrode 18 is provided with an extended surface 22 having for example, dimples or indented portions 24 so as to provide an additional area of contact between it and the molten salt. In a similar manner, the electrode 20 is provided with dimpled or indented portions 26 and also includes finned section 28 to provide a radiating or conducting surface for heat flow to thereby aid in maintaining the required temperature gradient across the molten salt. Electrodes 18 and 20 are externally short-circuited by a wire 30 so that this temperature gradient imposed across the molten salt 13 will, since the salt is an electrolytic conductor, cause a passage of electric current and a consequent decomposition of the zinc chloride at the electrodes 18 and 20 to liberate the gaseous constituent at the negative electrode and the metallic constituent at the positive electrode.

Adjacent to and above the cathode 18 a bell-shaped or the like gas collector 32 is disposed, this bell-shaped device serving as a collector or catch basin for the gas constituent formed at electrode 18. Attached to and in communication with the gas collector 32 is a conduit 34 which leads the gaseous constituent of decomposition downwardly and discharges it through a bell-shaped or the like gas dispenser 35. Situated above gas dispenser 35 and directly below anode 20 is a porous electrode 36. This electrode, in conjunction with a wire screen electrode 38 that is disposed above it, form cell section within the container 12. Generated power is tapped from the fuel cell through leads 40 and 42 connected to the electrodes 36 and 38 respectively.

The electrode reactions are as follows.

I. Cathode electrode 18:

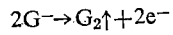

II. Anode electrode 20:

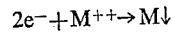

III. Porous electrode 36:

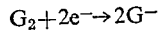

IV. Metal screen electrode 38:

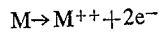

where M is the metallic constituent of the fused salt (e.g., zinc chloride) and G is the gaseous constituent thereof.

In operation, the imposition of a temperature gradient across electrodes 18 and 20 causes electrolysis of the molten salt to occur and a decomposition of the salt into its gaseous and metallic constituents. The gaseous constituent is formed at the cathode 18 which may be either the hot or cold electrode depending upon the particular salt utilized and collected by collector 32 and then led to the porous electrode 36 through conduit 34, the generated gas pressure being sufficient to insure proper circulation. The gas percolates through this electrode and combines with the metal constituent of the salt which forms at the anode 20 and, in turn, settles or sinks through the molten salt bath, passing through wire screen electrode 38. Combination of these constituents, as detailed above, generates electrical power which may be utilized in any desired manner.

Figure 2:
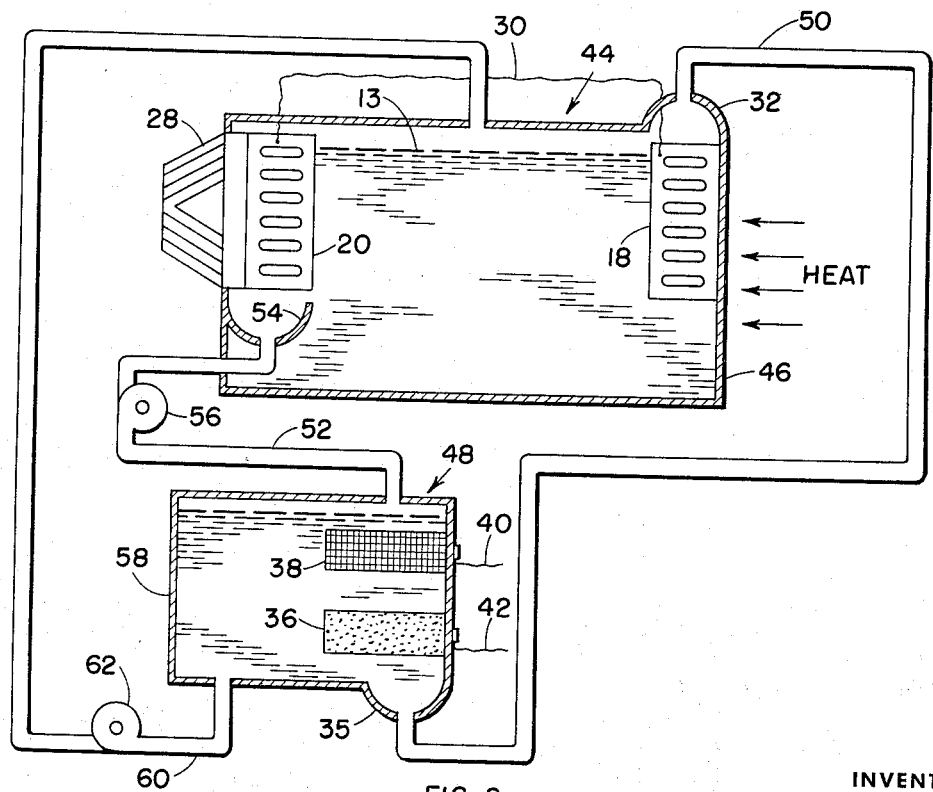
FIG. 2 is a schematic illustration of another form of apparatus utilizing the novel method of the invention.

Turning now to the alternate embodiment of the invention illustrated in FIG. 2, there is shown a further concept of the invention wherein the fuel cell and regenerator sections are physically isolated from each other. Cathode 18 and anode 20, similar to the first embodiment, are immersed in the molten salt 13 such as zinc chloride and provided with extended surfaces by the use of a plurality of indented portions such as dimples 24 and 26, respectively. However, as clearly seen in FIG. 2, these electrodes are housed in a separate regenerator section 44 formed by container 46.

A bell-shaped or the like gas collector 32 is disposed above hot electrode 18 and is in communication with fuel cell section 48 by means of a conduit 50 which provides passage for the gas constituent to the fuel cell section. Conduit 52 is also in communication with the regenerator section 44 and fuel cell section 48 to provide passage for the metallic constituent of the molten salt. This conduit has attached to the top thereof a dished portion or section 54 to collect the metal constituent formed at the cold electrode 20 and a pump 56 is provided to insure flow of the molten metal constituent in the conduit 52.

The fuel cell section 45 is enclosed in container 58 and has disposed therein a porous electrode 36 and a wire screen electrode 38, with the screen electrode disposed above the porous electrode in a manner similar to the first illustrated embodiment so that the gas constituent percolates upwardly as the metal constituent passes through the wire screen electrode to recombine therebetween and produce electric power which is passed to a load through leads 40 and 42.

The recombined molten salt is returned to the regenerator section 44 through return conduit 60 provided with pump 62 which overcomes any difference in head between the separated regenerator and fuel sections.

It will be understood, of course, that the output of cells made pursuant to this invention is dependent upon a number of factors other than that determined by the selection of the particular salt to be utilized as the electrolytic conductor, of course the salt selected governs whether the cathode gas-producing electrode is the hot or cold side of the regenerator section.

For cells producing a high rate of current, it is desirable that the electrodes in the regenerator and fuel cell sections be as closely spaced as possible and the selected electrolyte have a low value of resistance to the flow of current. Further, high current rates are best obtained by utilizing the highest temperature gradient possible consistant with the particular fused salt selected.

Obviously, many modifications and variations of the present invention are possible in the light of the above teachings. It is therefore, to be understood that within the scope of the appended claims, the invention may be practiced other than as specifically described.

What is claimed is:

1. A fuel cell and regenerator system comprising: a first and second pair of electrodes; said first pair of electrodes disposed in spaced relation in a molten electrolytic salt; a wire externally shorting said first pair of electrodes; a gas conducting conduit disposed adjacent to and in communication with said first pair of electrodes and leading to said second pair of electrodes, whereby electrolysis of said salt at said first pair of electrodes provides decomposed constituents for recombination at said second pair of electrodes.

2. The fuel cell and regenerator system according to claim 1 wherein a container is provided; said container enclosing said first and second pair of electrodes.

3. The fuel cell and regenerator system according to claim 2 wherein said second pair of electrodes are disposed beneath said first pair of electrodes.

4. A fuel cell and regenerator system comprising: a container for holding a molten salt selected from the group consisting of cadmium bromide, cadmium chloride, lead chloride, zinc chloride, lead bromide, zinc bromide, silver nitrate, silver chloride, silver bromide, silver iodide and stannous chloride; a pair of space electrically connected electrodes disposed in the upper portion of said container and in contact with said molten salt; a gas collecting baffle disposed above one of said pair of electrodes; a second pair of spaced electrodes disposed within said container and immersed in said molten salt bath beneath the other of said first pair of electrodes; a conduit leading from said gas collecting baffle to one of said second pair of electrodes whereby a heat gradient imposed across said first pair of electrodes produces power at said second pair of electrodes.

5. A method of producing electric current comprising: providing a cell containing a fused salt electrolyte selected from the group consisting of cadmium bromide, cadmium chloride, lead chloride, zinc chloride, lead bromide, zinc bromide, silver nitrate, silver chloride, silver bromide, silver iodide and stannous chloride; heating said fused salt above its melting point; imposing a temperature gradient across said salt; providing an external electrical short-circuit connection between the hot and cold portions of said salt to decompose said salt into its constituents by electrolysis; and recombining the constituents to provide an electric current.

6. The method according to claim 5 wherein the metal constituent of electrolysis is separated from the molten salt by the force of gravity.

7. An apparatus for the production of power comprising: a container holding a molten salt electrolyte; means for imposing a temperature gradient upon said molten salt; a first pair of electrodes disposed in said container in spaced relation and immersed in said molten salt to thereby provide an anode and a cathode; an external wire electrically shorting said first pair of electrodes; a second pair of electrodes disposed in spaced relation in said container beneath said anode; and a conduit communicating between said cathode and said second pair of electrodes whereby electrolysis of said molten salt at said first pair of electrodes produces an electric current at said second pair of electrodes.

8. The apparatus according to claim 7 wherein said second pair of electrodes comprises a wire screen electrode and a porous electrode.

9. The apparatus according to claim 8 wherein said wire screen electrode is disposed above said porous electrode.

References Cited

UNITED STATES PATENTS

| | | | |
|---|---|---|---|
| 1,545,385 | 7/1925 | Ashcroft | 204—66 |
| 1,588,608 | 6/1926 | Oppenheim | 136—86 |
| 2,384,463 | 9/1945 | Gunn et al. | 136—86 |
| 2,980,749 | 4/1961 | Broers | 136—86 |
| 3,256,504 | 6/1966 | Fidelman | 204—150 X |

FOREIGN PATENTS

| | | |
|---|---|---|
| 1,266,037 | 5/1961 | France. |

ALLEN B. CURTIS, *Primary Examiner.*